US007319309B1

(12) United States Patent
Cannon et al.

(10) Patent No.: US 7,319,309 B1
(45) Date of Patent: Jan. 15, 2008

(54) LOAD TAP CHANGE MONITORING SYSTEM AND METHOD

(75) Inventors: Michael Cannon, Sioux City, IA (US); Mark Peterson, Sioux City, IA (US); Aaron Peterson, Sioux City, IA (US)

(73) Assignee: Cannon Technologies/Cooper Power, Minneapolis, MN (US)

( * ) Notice: Subject to any disclaimer, the term of this patent is extended or adjusted under 35 U.S.C. 154(b) by 170 days.

(21) Appl. No.: 10/992,324

(22) Filed: Nov. 18, 2004

Related U.S. Application Data

(60) Provisional application No. 60/523,770, filed on Nov. 20, 2003.

(51) Int. Cl.
*G05F 1/47* (2006.01)
*H02J 3/12* (2006.01)

(52) U.S. Cl. ...................................... 323/256; 323/341

(58) Field of Classification Search ........ 323/255–260, 323/264, 340, 341
See application file for complete search history.

(56) References Cited

U.S. PATENT DOCUMENTS

| | | | | |
|---|---|---|---|---|
| 3,819,892 | A * | 6/1974 | Rathbun | 218/118 |
| 5,428,551 | A * | 6/1995 | Trainor et al. | 700/298 |
| 5,633,580 | A | 5/1997 | Trainor et al. | |
| 6,072,305 | A | 6/2000 | Trainor et al. | |
| 6,091,032 | A | 7/2000 | Dohnal et al. | |
| 6,100,674 | A | 8/2000 | Dohnal et al. | |
| 6,124,726 | A | 9/2000 | Dohnal et al. | |
| 6,472,850 | B2 | 10/2002 | Fletcher et al. | |
| 6,529,858 | B1 | 3/2003 | Dohnal et al. | |
| 6,693,247 | B1 | 2/2004 | Byers et al. | |

OTHER PUBLICATIONS

Predictive Power, Taptracker, see www.predictivepower.com/products.htm.

* cited by examiner

*Primary Examiner*—Gary L Laxton
(74) *Attorney, Agent, or Firm*—Patterson, Thuente, Skaar & Christensen, P.A.

(57) ABSTRACT

A system and method for remotely monitoring load tap changes on utility-type equipment are disclosed. In one example embodiment, a sensor measures a voltage before a tap change and compares the measured voltage to a voltage after the tap change. From this information, the direction of the tap change and the distance traveled can be determined. The system and method can also include a timer to measure an elapsed time required to complete a particular tap change and use this time information to determine the distance traveled. The direction of the tap change can be determined from a sensor that triggers the timer. The system and method thereby enable efficient and cost-effective remote monitoring of load tap changes and positions.

30 Claims, 4 Drawing Sheets

LOAD TAP CHANGE MONITORING SYSTEM AND METHOD

RELATED APPLICATION

This application claims the benefit of U.S. Provisional Application No. 60/523,770 filed Nov. 20, 2003, which is incorporated herein in its entirety by reference.

TECHNICAL FIELD

The invention generally relates to a system, software, and method for remotely monitoring load tap changes on utility-type transformer equipment.

BACKGROUND OF THE INVENTION

In service, a load tap changing transformer is supplied with an input voltage and produces an output voltage. The purpose of a tap changer is to produce an output voltage that is well-regulated or stable despite fluctuations in the input voltage and load. The load tap changer has a number of spaced-apart output terminals and performs its regulatory function by adjusting the tap position so that, for a given input voltage, the output is taken from whichever tap yields an output voltage closest to the target level. The number of taps provided depends on the environment in which the tap changer is designed to operate and which is necessary to control the output voltage. The dynamic range of the tap changer is typically rated voltage plus or minus 10%. When the input voltage is at its rated value, and the tap changer tap position is in neutral, the output voltage of the transformer is at rated voltage. Operators of large industrial electrical installations utilizing transformers with tap changers need information about tap positions on the transformers because of the associated bearing on economy of operation, maintenance, safety, and system performance.

Various kinds of apparatus have been developed in the past for determining the tap position of a tap changer. These prior developments have culminated in standard electromechanical tap position indicators, or meters, that are physically attached as an add-on to the tap changer mechanism. The tap changer is typically a mechanical device that changes the tap position on a transformer by physically moving the contacts from one tap to another tap. The attached tap position indicator moves with the tap changer mechanism and displays the tap position on a dial or in some other conventional manner. A conventional electromechanical meter for displaying the tap position has drawbacks, such as producing only a local meter indication, which can be read by an operator only by going to the site of the meter. Furthermore, if meter readings are converted into a signal that can be transmitted to a remote location for reading or to a centrally located computer for processing, such conversion must be performed reliably and cost effectively if it is to be a viable tool.

Patents relating to the monitoring or determination of the tap position of a tap changer include U.S. Pat. Nos. 4,419,619, 4,612,617 and 5,119,012. U.S. Pat. No. 6,472,850 discloses a method and apparatus for determining a voltage regulator tap position. The devices and methods shown in these patents all have various drawbacks, including relative complexity and lack of applicability in retrofit situations.

In view of the foregoing, there is a need in the industry for a method and a system for efficiently and cost effectively monitoring load tap changes on a transformer. In addition, providing this information from a remote location and with a high level of accuracy would substantially meet the needs of utility companies for monitoring the tap movement range and real time position of remote tap changing transformers.

SUMMARY OF THE INVENTION

The invention described herein provides convenient methods to remotely track the position of load tap changing equipment that is used for voltage regulation on power transformer equipment.

Embodiments of one method and system according to the invention utilize a sensor to sense current flow in the load tap changer (LTC) motor circuit and present this as a status event to a remote terminal unit (RTU) connected to a supervisory control and data acquisition (SCADA) system. When the status change is sensed, a voltage reading is initiated by the RTU. When the status reverts to its non-asserted condition, a second voltage reading is initiated by the RTU. The voltage difference between the first reading and the second reading is then determined and divided by a configurable volts per step value (0.75 volts per step for most configurations) to determine the number of steps involved in the tap change, rounded to the nearest integer. This number is then added to or subtracted from the present value of the tap position. To initiate the system, the present value of the tap position is a data input to a software program as part of the initial configuration. The tap position can be checked periodically and adjusted if necessary.

Embodiments of a further method and system according to the invention utilize two sensors to sense current flow in an LTC motor circuit and present the sensed current flow as a status event to an RTU connected to a SCADA system. A first sensor is initiated by an LTC raise circuit and a second sensor is initiated by an LTC lower circuit. When a status change is sensed in an asserted condition, a timer resident in a software application is started. When the status reverts to a non-asserted condition, the timer is stopped. The elapsed time as measured by the timer is then divided by the average time per tap change, a value configurable in the software application, to determine how many steps were traveled. This value is then added or subtracted as appropriate to the present value of the tap position. The direction of the tap change is determined by whichever sensor, the first or second, initiates the timer function. To initiate the system, the present value of the tap position is input as a data point into the software application as part of the initial configuration. As in the previous method, the tap position can be checked periodically and adjusted as needed.

The system and method of the invention substantially meet the aforementioned needs of the electric utility industry in providing a monitoring system that easily transmits load tap change data back to the transformer operator.

The above summary of the invention is not intended to describe each illustrated embodiment or every implementation of the invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawing, in which.

Figure 1:
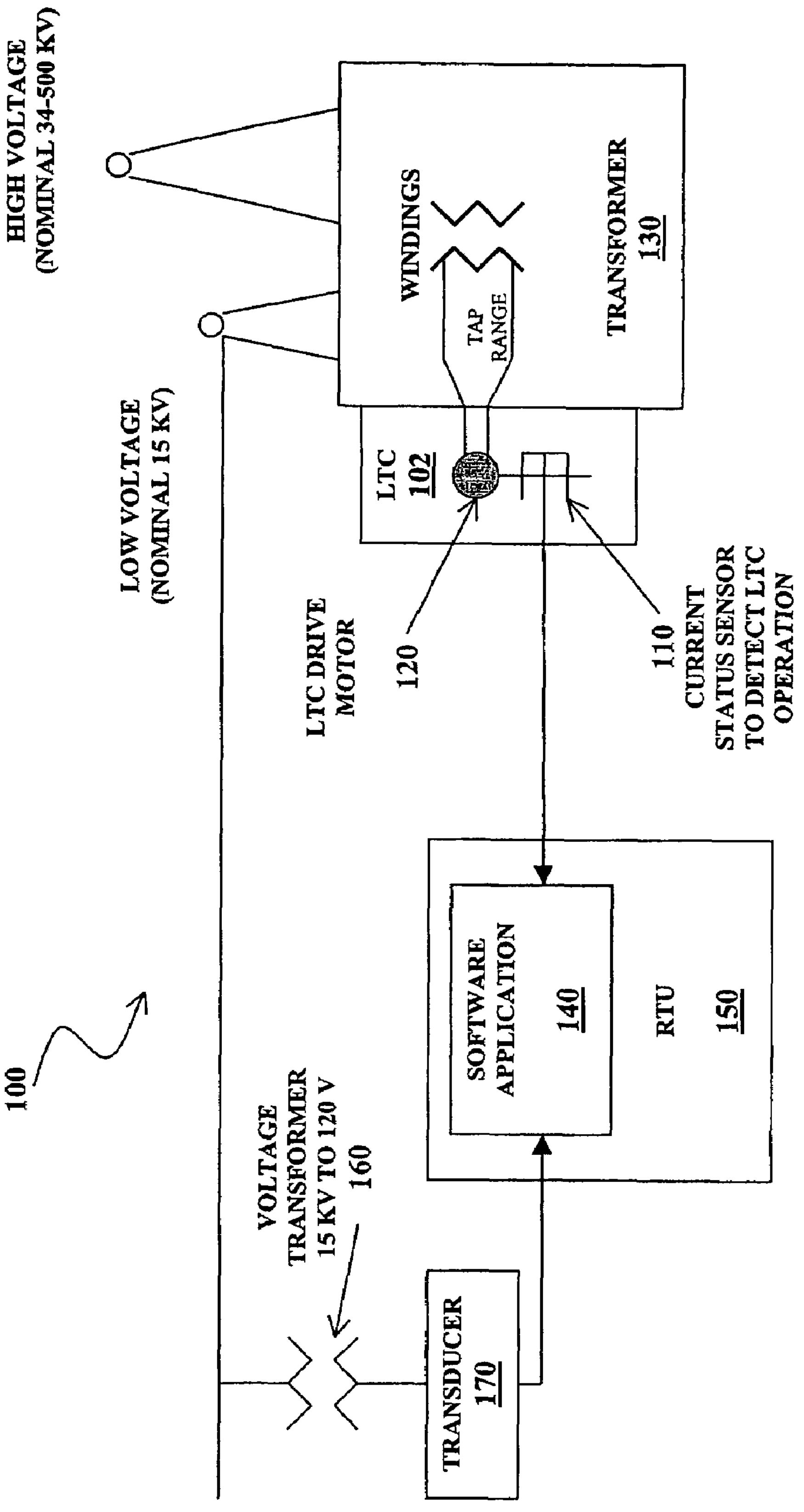
FIG. 1 is a block diagram of a system of remotely tracking load tap changes at a transformer according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The invention is generally directed to a method and system for remotely tracking the position of load tap changing equipment that is used for voltage regulation on power transformer equipment. The invention can be more readily understood by reference to FIGS. 1-4 and the following description. While the invention is not necessarily limited to such an application, the invention will be better appreciated using a discussion of example embodiments in such a specific context.

In one embodiment illustrated by FIG. 1, a load tap changer monitoring system 100 includes a load tap changer (LTC) 102 and a hardware current status sensor 110. Sensor 110 is an ACST sensor, made by Cannon Technologies of Golden Valley, Minn., in one embodiment, or another similar and compatible sensor known to those skilled in the art, that is coupled to an LTC motor circuit 120 and a transformer 130. A custom remote terminal unit (RTU) software program 140, for example the Cannon SUBSTATION ADVISOR System or another similar and compatible software program known to those skilled in the art, resident in an RTU 150, is also coupled to sensor 110. The transformer secondary voltage is measured by a voltage transformer 160, which is connected to a voltage transducer 170. LTC 102 typically utilizes a sixteen-step raise and a sixteen-step lower scale, each consisting of ⅝% per step to provide the ability to vary power transformer 130 output voltage by plus or minus 10%, i.e. 16 steps×⅝% per step=10% output voltage variation or change in each direction.

The system and method described herein utilize sensor 110 to sense current flow in LTC drive motor 120 and present sensed current flow as a status event to RTU software application 140 connected to a SCADA system. When the status change is sensed, a voltage reading is initiated by RTU 150. When the status reverts to a non-asserted condition, a second voltage reading is initiated by RTU 150. The voltage difference between the first reading and the second reading is then determined and divided by a configurable volts per step value to determine the number of steps involved in the tap change, rounded to the nearest integer. The volts per step value is 0.75 in this one example embodiment. The determined number of steps is then added, or subtracted, to the present value of the tap position. To initiate the system, the present value of the tap position is input as data to software application 140 as part of the initial configuration. The tap position can be checked and verified periodically and adjusted if necessary to maintain accuracy.

In another example embodiment, the method of the invention monitors the real time voltage change produced by LTC 102 and divides this voltage change by the volts per step of LTC 102. Access to real-time information previously difficult or impossible to obtain is now facilitated in this operation. As described above, most LTCs use sixteen steps in each direction to raise and lower the voltage of transformer 130 in causing a 10% voltage change in either direction. This results in a ⅝% change in voltage per step, which is about 0.75 volts/step on a 120 volt based system for this example. The actual amounts are dependent on system 100 changes that can take place, but these should cause minimal effect due to the "step" nature of the mechanism that produces a fairly coarse change per step. For instance, if LTC 120 moves two steps, a 0.75×2, or 1.5-volt, change is expected. Due to simultaneous system 100 changes, the measured change might be 1.2 volts, 1.6 volts, etc; however, when divided by 0.75 and rounded to the nearest integer, each produces a value of "2." The voltage measurements should be taken in real time, however, and the process should be initiated by current status sensor 110 that monitors operation of LTC motor 120 in one embodiment.

Figure 2:
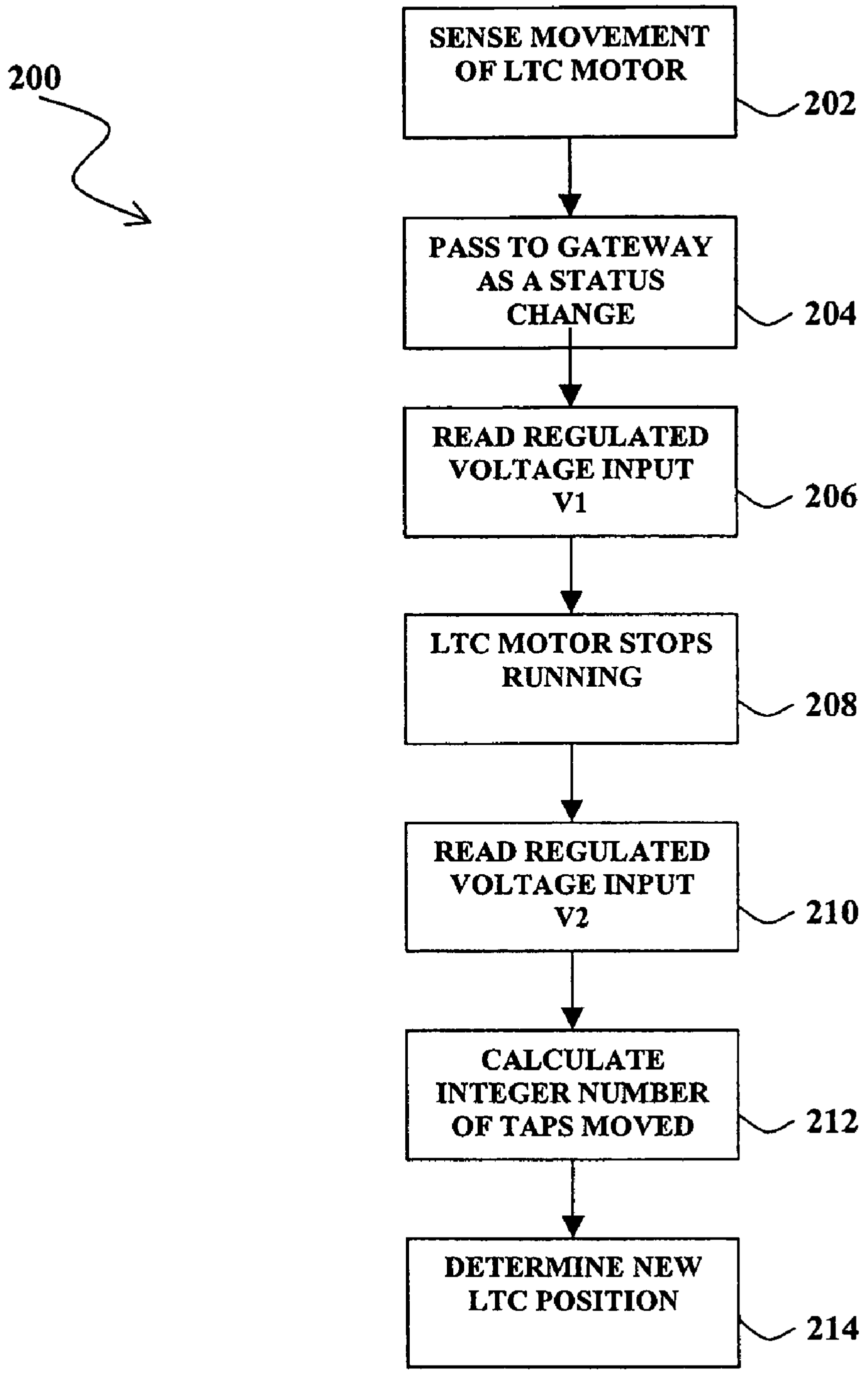
FIG. 2 is a flowchart of a method for determining a load tap changer position change according to the embodiment of FIG. 1.

Referring to the flowchart of FIG. 2, by way of load tap monitoring system 100 as described above with reference to FIG. 1, a method 200 of measuring real-time voltage for determining LTC 102 position changes includes sensing the movement of LTC motor 120 by current sensor 110 at step 202. This sensed movement is passed to RTU 150 and software application 140 as a status change at step 204. At step 206, the status change keys RTU 150 to read the regulated voltage input V1. When LTC motor 120 stops running at step 208, the status reverts, keying a second voltage reading V2 at step 210.

The two voltage readings are then subtracted to approximate the voltage change produced by LTC 102. This voltage change is then divided by a configurable value, which in this example is about 0.75 volts per step. Again as described above, this is based on a standard +/−10% LTC that changes voltage at about ⅝% per step on a 120-volt base, wherein ⅝% of 120 volts=0.75 volts per step each direction for raise and lower directions of movement. This result is rounded to the nearest integer to represent the number of taps moved to complete step 212. The number generated at step 212 is then added for voltage increases, or subtracted for voltage decreases, to the previous LTC position to obtain the new value at step 214. This new value is used for subsequent tap changes in order to continue monitoring system 100 and repeating method 200. Further, this new value then becomes the LTC position for the next calculation.

Figure 3:
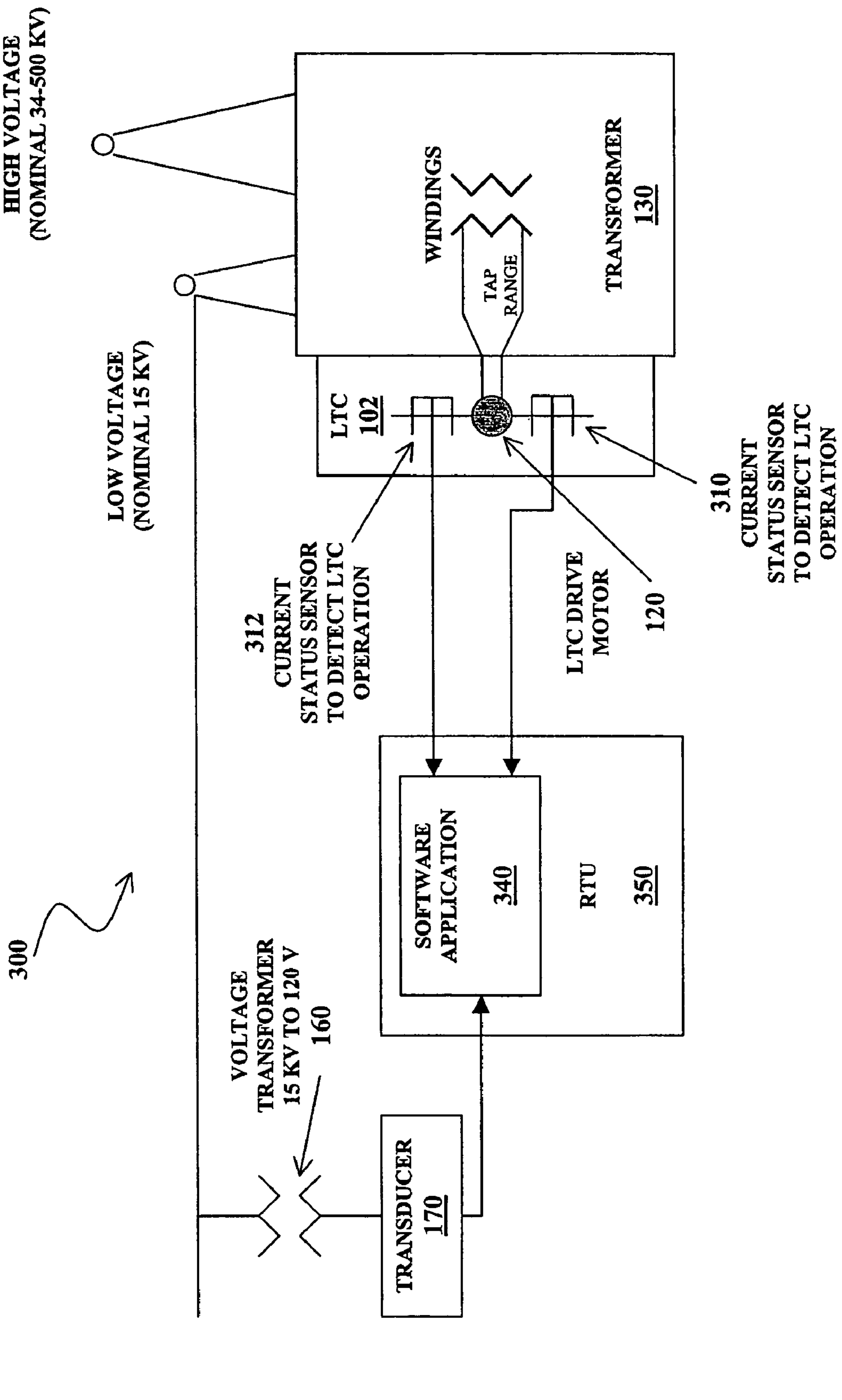
FIG. 3 is a block diagram of a system of remotely tracking load tap changes at a transformer according to another embodiment of the invention.
Figure 4:
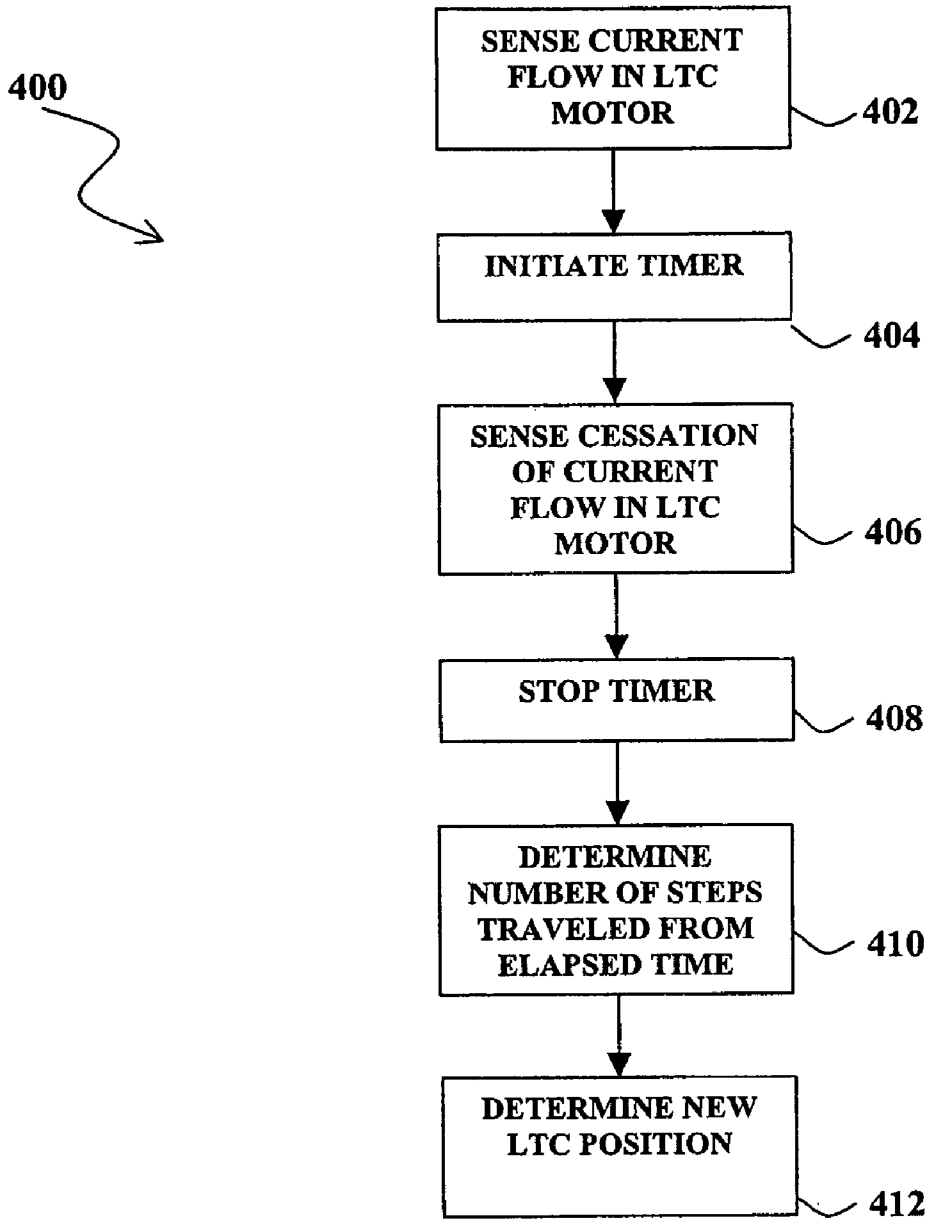
FIG. 4 is a flowchart of a method for determining a load tap changer position change according to the embodiment of FIG. 3.

Referring to FIGS. 3 and 4, embodiments of a further method 400 according to a system 300 of the invention are illustrated. System 300 utilizes two sensors to sense current flow in LTC motor drive 120 and present the sensed current flow as a status event to RTU software application 340 connected to a SCADA system at RTU 350. A first sensor 310 is initiated by an LTC raise circuit and a second sensor 312 is initiated by an LTC lower circuit. When a status change is sensed in an asserted condition at step 402, a timer resident in software application 340 is initiated at step 404. When the status reverts to a non-asserted condition at subsequent step 406, the timer is stopped at step 408. At step 410, the elapsed time as measured by the timer is then divided by the average time per tap change, a value configurable in software application 340, to determine how many steps were traveled. This value is then added or subtracted as appropriate to the present value of the tap position to determine the new LTC position at step 412. The direction of the tap change is determined by which sensor, the first 310 or second 312, initiates the timer function. To initiate the system, the present value of the tap position is input to software application 340 as part of the initial configuration. As in the previous method, the tap position can be checked periodically and adjusted as needed.

In one example embodiment according to the invention, a load tap changing monitoring system includes an ACST sensor, made by Cannon Technologies of Golden Valley, Minn.; a voltage transducer; and a software application. This load tap changing monitoring kit is effective in embodiments of a system as described with reference to FIG. 1 to carry out a method as described with reference to FIG. 2, for example.

In another example embodiment according to the invention, a load tap changing monitoring system includes first and second ACST sensors, made by Cannon Technologies of Golden Valley, Minn.; a voltage transducer; and a software application. This load tap changing monitoring kit is effective in embodiments of a system as described with reference to FIG. 3 to carry out a method as described with reference to FIG. 4, for example.

The various embodiments disclosed and described herein provide several advantages over other known systems, including determining the number of steps the tap moved in addition to determining the direction of the tap movement. The invention divides a measured voltage change by a configurable value to determine how many steps were taken as well as a direction of tap movement along the transformer. The invention can also divide an elapsed time by the average time per tap change to determine how many steps the tap traveled. Further, the invention is compatible with and retrofitable to other transformers or controls, as the invention is intended to address any tap changer and has no dependence on the control used.

In addition, the tap changer monitoring system of the invention is not limited to a control self-contained and resident on the particular transformer, as with other designs. Further, the invention is applicable to voltage regulator applications. The invention uses software resident in the substation RTU, or gateway, and can be applied to multiple transformers without concern or connection to a specific control unit. The invention also uses a distributed approach to retrieving the tap changing information.

The invention may be embodied in other specific forms without departing from the spirit of the essential attributes thereof; therefore the illustrated embodiment should be considered in all respects as illustrative and not restrictive, reference being made to the appended claims rather than to the foregoing description to indicate the scope of the invention.

What is claimed is:

1. A method for remotely tracking load tap position changes at a power transformer, the method comprising:

determining a starting position of a load tap changer of the power transformer;

sensing a first status change of a load tap changer drive, without using a physical position encoder;

initiating a first data reading upon sensing the first status change;

sensing a second status change of the drive, without using a physical position encoder;

initiating a second data reading upon sensing the second status change;

determining a number of tap step changes of the load tap changer drive from the first and second data readings; and determining a new load tap changer position.

2. The method of claim 1, wherein the step of determining a number of tap step changes of the load tap changer drive from the first and second data readings comprises:

calculating a difference between the first data reading and the second data reading; and dividing the difference by a per tap step value.

3. The method of claim 2, wherein the step of determining a new load tap changer position comprises adding to or subtracting from the starting position of the load tap changer, the number of steps moved by the load tap changer.

4. The method of claim 2, wherein the first and second data readings are voltage-level readings.

5. The method of claim 2, wherein the per tap step value is user configurable.

6. The method of claim 5, wherein the per tap step value is about 0.75 volts.

7. The method of claim 2, wherein the number of steps moved by the load tap changer is rounded to the nearest integer value.

8. The method of claim 1, wherein the first and second data readings are initiated in real time.

9. The method of claim 1, wherein the step of sensing a first status change of the load tap changer drive comprises sensing a current flow in a load tap changer drive motor.

10. The method of claim 9, wherein the step of sensing a second status change of the drive comprises sensing a cessation of current flow in the load tap changer drive motor.

11. A method for remotely tracking load tap position changes at a power transformer, the method comprising:

determining a starting position of a load tap changer of the power transformer;

initiating a timer upon sensing a first status change in a load tap changer circuit arrangement, wherein sensing the first status change is accomplished without the use of a physical position encoder;

stopping the timer upon sensing a second status change in the load tap changer circuit arrangement, wherein sensing the second status change is accomplished without the use of a physical position encoder;

determining a number of tap step changes of the load tap changer from an elapsed time measured by the timer; and determining a new load tap changer position based on the number of tap step changes.

12. The method of claim 11, wherein the step of determining a number of tap step changes of the load tap changer comprises dividing the elapsed time by an average time per tap step change to determine a number of steps traveled.

13. The method of claim 12, wherein the average time per tap step change is configurable.

14. The method of claim 11, further comprising the step of determining a direction of movement of the load tap changer after determining the number of tap step changes.

15. The method of claim 14, wherein the load tap changer circuit arrangement is comprised of at least one of two load tap changer circuits, wherein a first load tap changer circuit is a raise circuit and a second load tap changer circuit is a lower circuit, and wherein the direction of movement of the load tap changer is determined by whether the first or second load tap changer circuit initiates and stops the timer.

16. The method of claim 11, wherein the step of determining a new load tap changer position comprises adding to or subtracting from the starting position of a load tap changer, the number of tap step changes of the load tap changer.

17. The method of claim 11, wherein the step of sensing a first status change in a load tap changer circuit comprises sensing a current flow in the load tap changer circuit.

18. The method of claim 17, wherein the step of sensing a second status change in the load tap changer circuit comprises sensing a cessation of current flow in the load tap changer circuit.

19. A system for remotely tracking load tap changes at a power transformer, the system comprising:

a sensor operable to sense a status change of a load tap changer drive, without use of a physical position encoder; and a remote terminal unit in electrical communication with the sensor and adapted to initiate a first data reading upon a first status change of the drive, initiate a second data reading upon a second status change of the drive, and determine a change in position of the load tap changer drive from the first and second data readings.

20. The system of claim 19, wherein the sensor comprises a hardware current status sensor, and wherein the first status change comprises an initiation of current flow in the drive and the second status change comprises a cessation of current flow in the drive.

21. The system of claim 19, wherein the remote terminal unit includes a software application.

22. The system of claim 21, wherein the remote terminal unit and the software application are adapted to determine a new tap position.

23. The system of claim 19, wherein the first and second data readings comprise voltage readings.

24. A system for remotely tracking load tap position changes at a power transformer, the system comprising:

a first sensor adapted to sense a status change in a first load tap changer circuit arrangement without using a physical position encoder;

a second sensor adapted to sense a status change in a second load tap changer circuit arrangement without using a physical position encoder; and a remote terminal unit comprising a timer electrically coupled to the first and second sensors, wherein the timer is adapted to measure an elapsed time between subsequent status changes of either the first circuit or the second circuit, and wherein the remote terminal unit is adapted to determine a tap change from the elapsed time.

25. The system of claim 24, wherein the first and second sensors comprise current sensors, and wherein the first status change comprises an initiation of current flow and the second status change comprises a cessation of current flow.

26. The system of claim 24, wherein the remote terminal unit further comprises a software application adapted to communicate with the first and second sensors and the timer.

27. The system of claim 26, wherein the software application is adapted to determine a new tap position from the determined tap change.

28. A system for remotely tracking load tap position changes at a power transformer, the system comprising:

means for determining a starting position of a load tap changer of the power transformer;

means for sensing a first status change of a load tap changer drive without using a physical position encoder;

means for initiating a first data reading upon sensing the first status change;

means for sensing a second status change of the drive without using a physical position encoder;

means for initiating a second data reading upon sensing the second status change;

means for determining a number of tap step changes of the load tap changer drive from the first and second data readings; and means for determining a new load tap changer position based on the number of tap step changes.

29. A system for remotely tracking load tap position changes at a power transformer, the system comprising:

means for determining a starting position of a load tap changer of the power transformer;

means for measuring an elapsed time between a first status change in a load tap changer circuit arrangement and a second status change in the load tap changer circuit arrangement;

means for determining a number of tap step changes of the load tap changer based upon the elapsed time; and means for determining a new load tap changer position.

30. A method for remotely tracking load tap position changes at a power transformer, the method comprising:

determining a starting position of a load tap changer of the power transformer;

initiating a timer and initiating a first data reading upon sensing without using a physical position encoder a first status change in a load tap changer circuit arrangement;

stopping the timer and initiating a second data reading upon sensing without using a physical position encoder a second status change in the load tap changer circuit arrangement;

determining a number of tap step changes of the load tap changer from an elapsed time measured by the timer and from the first and second data readings; and determining a new load tap changer position.

* * * * *